US011087334B1

(12) United States Patent
McEachern et al.

(10) Patent No.: US 11,087,334 B1
(45) Date of Patent: Aug. 10, 2021

(54) METHOD AND SYSTEM FOR IDENTIFYING POTENTIAL FRAUD ACTIVITY IN A TAX RETURN PREPARATION SYSTEM, AT LEAST PARTIALLY BASED ON DATA ENTRY CHARACTERISTICS OF TAX RETURN CONTENT

(71) Applicant: Intuit Inc., Mountain View, CA (US)

(72) Inventors: Kyle McEachern, San Diego, CA (US); Brent Rambo, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 587 days.

(21) Appl. No.: 15/478,511

(22) Filed: Apr. 4, 2017

(51) Int. Cl.
| | |
|---|---|
| G06Q 30/00 | (2012.01) |
| G06Q 40/00 | (2012.01) |
| H04L 12/58 | (2006.01) |
| H04L 29/06 | (2006.01) |
| G06N 20/00 | (2019.01) |

(52) U.S. Cl.
CPC ......... *G06Q 30/0185* (2013.01); *G06N 20/00* (2019.01); *G06Q 40/123* (2013.12); *H04L 51/046* (2013.01); *H04L 63/0272* (2013.01); *H04L 63/0876* (2013.01); *H04L 63/10* (2013.01)

(58) Field of Classification Search
USPC .......................................................... 705/31
See application file for complete search history.

(56) References Cited

U.S. PATENT DOCUMENTS

| | | |
|---|---|---|
| 6,826,536 B1 | 11/2004 | Forman |
| 7,686,214 B1 | 3/2010 | Shao et al. |
| 7,813,944 B1 | 10/2010 | Luk et al. |

(Continued)

FOREIGN PATENT DOCUMENTS

| | | |
|---|---|---|
| EP | 2840542 A2 | 2/2015 |
| KR | 10-2006-0090834 | 8/2006 |
| KR | 101565957 B2 | 11/2015 |

OTHER PUBLICATIONS

Unger, "There's Never a Finish Line in the Race to Understand Technology. Keeping Up Is the Only Way to Get Ahead," Bank Technology News, Nov. 2002, 15.11:44. SourceMedia, Inc., 9 pages.

(Continued)

*Primary Examiner* — Hani M Kazimi
*Assistant Examiner* — Hatem M Ali
(74) *Attorney, Agent, or Firm* — Paradice and Li LLP

(57) ABSTRACT

Stolen identity refund fraud is one of a number of types of Internet-centric crime (i.e., cybercrime) that includes the unauthorized use of a person's or business' identity information to file a tax return in order to illegally obtain a tax refund from, for example, a state or federal revenue service. Because fraudsters use legitimate identity information to create user accounts in tax return preparation systems, it can be difficult to detect stolen identity refund fraud activity. Methods and systems of the present disclosure identify and address potential fraud activity. The methods and systems analyze data entry characteristics of tax return content that is provided to a tax return preparation system to identify potential fraud activity and perform one or more risk reduction actions in response to identifying the potential fraud activity.

8 Claims, 4 Drawing Sheets

(56) References Cited

U.S. PATENT DOCUMENTS

| | | |
|---|---|---|
| 7,840,455 B1 | 11/2010 | Venkatasubramanian et al. |
| 7,954,698 B1 | 6/2011 | Pliha |
| 8,346,691 B1 | 1/2013 | Subramanian et al. |
| 8,463,676 B1 | 6/2013 | Dinamani et al. |
| 8,607,353 B2 | 12/2013 | Rippert, Jr. et al. |
| 8,639,522 B2 | 1/2014 | Pathria et al. |
| 8,776,168 B1 | 7/2014 | Gibson et al. |
| 8,966,640 B1 | 2/2015 | Peddada et al. |
| 9,038,134 B1 | 5/2015 | Ackerman et al. |
| 9,171,334 B1 | 10/2015 | Visbal et al. |
| 9,990,678 B1 | 6/2018 | Cabrera et al. |
| 10,019,535 B1 | 7/2018 | Madhani et al. |
| 10,387,980 B1 | 8/2019 | Shahidzadeh et al. |
| 2002/0052841 A1 | 5/2002 | Guthrie et al. |
| 2003/0229519 A1 | 12/2003 | Eidex et al. |
| 2007/0294104 A1 | 12/2007 | Boaz et al. |
| 2007/0294195 A1 | 12/2007 | Curry et al. |
| 2008/0040779 A1 | 2/2008 | Budzichowski |
| 2008/0081601 A1 | 4/2008 | Moshir et al. |
| 2008/0086342 A1* | 4/2008 | Curry .................. G06Q 40/025 705/38 |
| 2009/0012896 A1 | 1/2009 | Arnold |
| 2009/0099884 A1 | 4/2009 | Hoefelmeyer et al. |
| 2009/0239650 A1 | 9/2009 | Alderucci |
| 2010/0077445 A1 | 3/2010 | Schneider et al. |
| 2010/0082384 A1 | 4/2010 | Bohrer et al. |
| 2010/0332362 A1 | 12/2010 | Ramsey et al. |
| 2011/0078062 A1 | 3/2011 | Kleyman |
| 2011/0225076 A1* | 9/2011 | Wang .................... G06Q 40/02 705/35 |
| 2011/0231257 A1 | 9/2011 | Winter |
| 2011/0282695 A1 | 11/2011 | Blue |
| 2012/0030076 A1 | 2/2012 | Checco et al. |
| 2012/0030079 A1 | 2/2012 | Slater et al. |
| 2012/0030080 A1* | 2/2012 | Slater .................. G06Q 40/123 705/35 |
| 2012/0030083 A1 | 2/2012 | Newman et al. |
| 2012/0036053 A1 | 2/2012 | Miller |
| 2012/0047072 A1 | 2/2012 | Larkin |
| 2012/0101927 A1 | 4/2012 | Leibon et al. |
| 2012/0109734 A1 | 5/2012 | Fordyce et al. |
| 2012/0226591 A1 | 9/2012 | Ramsey et al. |
| 2012/0311684 A1 | 12/2012 | Paulsen et al. |
| 2012/0317027 A1 | 12/2012 | Luk et al. |
| 2013/0117278 A1 | 5/2013 | Martens et al. |
| 2013/0151388 A1 | 6/2013 | Falkenborg et al. |
| 2013/0179314 A1 | 7/2013 | Stoke et al. |
| 2013/0226785 A1 | 8/2013 | Krake et al. |
| 2013/0346302 A1 | 12/2013 | Purves et al. |
| 2014/0012716 A1 | 1/2014 | Bucholz |
| 2014/0058910 A1 | 2/2014 | Abeles |
| 2014/0180883 A1 | 6/2014 | Regan |
| 2014/0195924 A1 | 7/2014 | Curtis et al. |
| 2014/0278479 A1 | 9/2014 | Wang et al. |
| 2014/0379531 A1 | 12/2014 | Huang et al. |
| 2015/0012430 A1 | 1/2015 | Chisholm et al. |
| 2015/0033305 A1 | 1/2015 | Shear et al. |
| 2015/0046181 A1 | 2/2015 | Adjaoute |
| 2015/0161622 A1 | 6/2015 | Hoffmann et al. |
| 2015/0220734 A1 | 8/2015 | Nalluri et al. |
| 2015/0278462 A1 | 10/2015 | Smoley et al. |
| 2015/0332414 A1 | 11/2015 | Unser et al. |
| 2015/0370978 A1 | 12/2015 | Van Arkel et al. |
| 2016/0012480 A1 | 1/2016 | Sharan et al. |
| 2016/0012561 A1 | 1/2016 | Lappenbusch et al. |
| 2016/0063645 A1* | 3/2016 | Houseworth .......... G06Q 50/265 705/31 |
| 2016/0071208 A1 | 3/2016 | Straub et al. |
| 2016/0078567 A1 | 3/2016 | Goldman et al. |
| 2016/0085986 A1 | 3/2016 | Long |
| 2016/0086185 A1 | 3/2016 | Adjaoute |
| 2016/0110512 A1 | 4/2016 | Adjaoute |
| 2016/0112451 A1 | 4/2016 | Jevans |
| 2016/0148321 A1 | 5/2016 | Ciaramitaro et al. |
| 2016/0180484 A1* | 6/2016 | Roebuck ............. G06Q 50/265 705/31 |
| 2016/0247239 A1 | 8/2016 | Houseworth et al. |
| 2016/0259896 A1 | 9/2016 | Yang |
| 2016/0267484 A1 | 9/2016 | Smoley et al. |
| 2016/0379182 A1 | 12/2016 | Sheng et al. |
| 2017/0017760 A1 | 1/2017 | Freese et al. |
| 2017/0032251 A1 | 2/2017 | Podgorny |
| 2017/0061093 A1 | 3/2017 | Amarasingham et al. |
| 2017/0148021 A1 | 5/2017 | Goldstein et al. |
| 2017/0177809 A1 | 6/2017 | Bull et al. |
| 2017/0178249 A1* | 6/2017 | Pigoski, II .......... G06Q 50/265 |
| 2017/0186097 A1 | 6/2017 | Mascaro et al. |
| 2017/0200137 A1 | 7/2017 | Vilmont |
| 2017/0221058 A1 | 8/2017 | Choudhary et al. |
| 2017/0270526 A1* | 9/2017 | Fitzgerald ............ G06Q 40/123 |
| 2017/0270629 A1 | 9/2017 | Fitzgerald |
| 2017/0293763 A1 | 10/2017 | Shear et al. |
| 2017/0293917 A1 | 10/2017 | Dhurandhar et al. |
| 2017/0301034 A1* | 10/2017 | Golasz ................ G06Q 40/123 |
| 2018/0033006 A1 | 2/2018 | Goldman et al. |
| 2018/0033009 A1 | 2/2018 | Goldman et al. |
| 2018/0033089 A1 | 2/2018 | Goldman et al. |
| 2018/0211332 A1 | 7/2018 | Kraemer et al. |
| 2018/0239870 A1 | 8/2018 | Goldman et al. |
| 2018/0253336 A1 | 9/2018 | Juretic et al. |
| 2019/0066248 A1 | 2/2019 | McEachern et al. |
| 2021/0035119 A1 | 2/2021 | Hayman et al. |

OTHER PUBLICATIONS

Moritz et al., "Fraud Risk Assessment—Identifying Vulnerabilities to Fraud and Misconduct," 2013 [online]. Retrieved from the Internet: <https://www.protiviti.com/US-en/insights/fraud-risk-assessment-identifying-vulnerabilities-fraud-and-misconduct>, 7 pages.

* cited by examiner

1

METHOD AND SYSTEM FOR IDENTIFYING POTENTIAL FRAUD ACTIVITY IN A TAX RETURN PREPARATION SYSTEM, AT LEAST PARTIALLY BASED ON DATA ENTRY CHARACTERISTICS OF TAX RETURN CONTENT

BACKGROUND

Tax return preparation systems are diverse and valuable tools, providing services that were either never before available, or were previously available only through interaction with a human professional. Prior to the advent of tax return preparation systems, a tax filer had to consult with a tax preparation professional for services and the tax filer would be limited, and potentially inconvenienced, by the hours during which the professional was available for consultation. Furthermore, the tax filer might be required to travel to the professional's physical location. Beyond the inconveniences of scheduling and travel, the tax filer would also be at the mercy of the professional's education, skill, personality, and varying moods. All of these factors resulted in a tax filer who was vulnerable to human error, variations in human ability, and variations in human temperament.

Tax return preparation systems provide services that human professionals are not capable of providing, such as: 24-hour-a-day and 7-day-a-week availability, unlimited geographical support, and not being subject to human error or variations in human ability or temperament. Because tax return preparation systems represent a potentially flexible, highly accessible, and affordable source of services, they have the potential of attracting both positive and negative attention.

Fraudsters (cybercriminals) target tax return preparation systems to obtain money or financial credit using a variety of unethical techniques. For example, fraudsters can target tax return preparation systems to obtain tax refunds or tax credits by using a combination of actual and fabricated information associated with actual tax filers to obtain tax refunds from one or more revenue agencies (e.g., the IRS). Exploitation of tax filers and tax return preparation systems can be traumatic for tax filers and can have a chilling effect on potential future use of tax return preparation systems. Such security risks are bad for tax filers and can damage relations between tax filers and tax return preparation service providers.

Fraudsters can use stolen identity refund fraud ("SIRF") as one technique for stealing from people, legal entities, and from state or federal revenue services. In SIRF, fraudsters obtain detailed information about an identity other than their own, using techniques such as stealing identities through phishing attacks (e.g., through deceitful links in email messages) or by purchasing identities using identity theft services in underground markets. Fraudsters then create user accounts in a tax return preparation system with the identities of actual people or businesses. The resulting user accounts may digitally appear to be legitimate because legitimate identity information was used to create the accounts, even though the creator of the accounts was not authorized to do so.

To help counteract and reduce the effect of stolen identity refund fraud, some revenue agencies have created rules for tax return preparation systems and tax return preparation service providers. Some rules include, upon potentially detecting fraudulent account activity, requirements to send messages to email addresses associated with an account or Social Security number. This rule unfortunately requires notifying the bad actors while not necessarily helping the victims of fraud. Other rules limit tax return preparation service providers' ability to delay filing a questionable tax return.

Consequently, a technical problem that exists for tax return preparation systems is the tax return preparation systems' need to identify potentially fraudulent activity and reduce the number of fraudulent tax return filings, while complying with tax return preparation service provider rules that have been mandated by federal and state revenue agencies.

SUMMARY

The present disclosure includes methods and systems for identifying potential fraud (e.g., stolen identity refund fraud) activity in a tax return preparation system, at least partially based on data entry characteristics of tax return content provided to the tax return preparation system by users of the tax return preparation system, according to one embodiment. To identify and address the potential fraud activity, a security system: compares new data entry characteristics of new tax return content of a new tax return for a tax filer identifier (e.g., Social Security Number) to the prior data entry characteristics of prior tax return content of one or more prior tax returns entered into the tax return preparation system, generates a risk score based on the comparison, and performs one or more risk reduction actions based on the likelihood of potential fraud that is represented by the risk score, according to one embodiment. The security system generates the risk score at least partially based on applying the new data entry characteristics of new tax return content of a new tax return to an analytics model, according to one embodiment. The security system generates the risk score at least partially based on applying system access information to an analytics model, according to one embodiment. The system access information represents characteristics of the device used to file the new tax return, according to one embodiment. The one or more risk reduction actions include, but are not limited to, delaying filing of the new tax return for up to as long as is legally permitted (e.g., 72 hours), communicating with a user who appears to be a legitimate user of the tax return preparation system (e.g., is the owner of the tax filer identifier), and collaborating with the legitimate user to cancel the fraudulent tax return submitted to the tax return preparation system, according to various embodiments. Consequently, embodiments of the present disclosure represent a technical solution that identifies and addresses potential fraud activity in a tax return preparation system to resolve the Internet-centric technical problem of fraudulent tax returns being prepared and filed with stolen identification information.

By identifying potential fraud activity in a tax return preparation system, at least partially based on data entry characteristics of tax return content, the present disclosure represents a technical solution to a long standing technical problem of stolen identify refund fraud in tax return preparation systems. Therefore, the disclosed embodiments do not represent an abstract idea for at least a few reasons. First, identifying potential fraud activity in a tax return preparation system, at least partially based on data entry characteristics of tax return content is not an abstract idea because it is not merely an idea itself (e.g., cannot be performed mentally or using pen and paper). Indeed, some of the disclosed embodiments of determining levels of risk include applying data representing tax return content to analytics models to generate data representing risk scores, which cannot be performed mentally. Second, identifying potential fraud activity in a tax return preparation system, at least partially based on data entry characteristics of tax return content is not an abstract idea because it is not a fundamental economic practice (e.g., is not merely creating a contractual relationship, hedging, mitigating a settlement risk, etc.). Third, identifying potential fraud activity in a tax return preparation system, at least partially based on data entry characteristics of tax return content is not an abstract idea because it is not a method of organizing human activity (e.g., managing a game of bingo). Fourth, although mathematics may be used to generate an analytics model, identifying potential fraud activity in a tax return preparation system at least partially based on data entry characteristics of tax return content is not simply a mathematical relationship/formula but is instead a technique for transforming data representing tax return content and tax return history into data representing a risk score, which quantifies the likelihood that a tax return is being fraudulently prepared or submitted, according to one embodiment.

Further, identifying potential fraud activity in a tax return preparation system, at least partially based on data entry characteristics of tax return content is not an abstract idea because the disclosed techniques allow for significant improvement to the technical fields of information security, fraud detection, and tax return preparation systems, according to one embodiment. The present disclosure adds significantly to the field of tax return preparation systems by reducing the risk of victimization in tax return filings and by increasing tax return preparation system users' trust in the tax return preparation system. This reduces the likelihood of users seeking other less efficient techniques (e.g., via a spreadsheet, or by downloading individual tax forms) for preparing and filing their tax returns.

As a result, embodiments of the present disclosure allow for reduced use of processor cycles, processor power, communications bandwidth, memory, and power consumption, by reducing a likelihood of fraudulent tax return filings and therefore reducing the likelihood of multiple tax returns being filed for a single person or entity, according to one embodiment. Consequently, computing and communication systems implementing or providing the embodiments of the present disclosure are transformed into more operationally efficient devices and systems.

In addition to improving overall computing performance, identifying potential fraud activity in a tax return preparation system helps maintain or build trust and therefore loyalty in the tax return preparation system, which results in repeat customers, efficient delivery of tax return preparation services, and reduced abandonment of use of the tax return preparation system, according to various embodiments.

Figure 1:
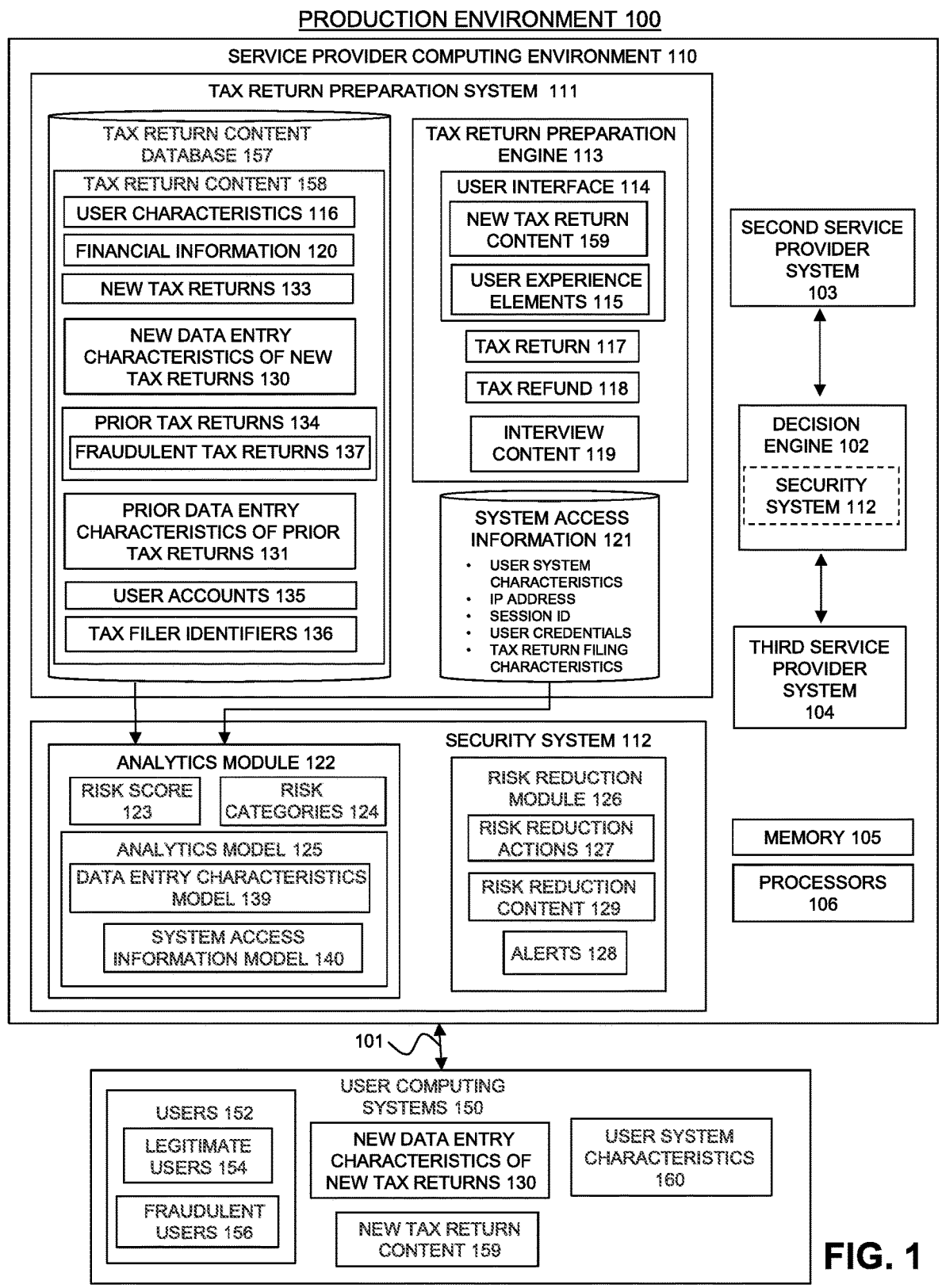
FIG. 1 is a block diagram of software architecture for identifying potential fraud activity in a tax return preparation system, at least partially based on data entry characteristics of tax return content provided to the tax return preparation system, in accordance with one embodiment.

Common reference numerals are used throughout the FIGs. and the detailed description to indicate like elements. One skilled in the art will readily recognize that the above FIGs. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be implemented in many different forms and should not be construed as limited to the embodiments set forth herein, shown in the FIGS., or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, and PROCESS sections herein describe systems and processes suitable for identifying potential fraud activity in a tax return preparation system, at least partially based on data entry characteristics of tax return content of a tax return for a tax filer identifier, according to various embodiments.

Stolen identity refund fraud is a costly crime. It is one of a number of types of Internet-centric crime (i.e., cybercrime) that includes unauthorized use of business or personal identity information to file for a tax refund, without permission of the owner of the identity information. Cybercriminals (a.k.a., fraudsters) typically create user accounts in financial systems, add information to the user accounts to increase the chances of obtaining tax refunds with the user accounts, file tax returns for the user accounts, and direct the tax refunds to the fraudsters or to financial institution accounts (e.g., bank accounts) that the fraudsters can access. Because fraudsters may acquire the business or personal identity information through illegal sales, phishing, spyware, or malware scams, fraudsters are acquiring the identity information associated with unsuspecting victims. In the case of tax return preparation systems, fraudsters create accounts and create their own login credentials, populate the user accounts with legitimate identity information (e.g., name and social security number), may fabricate or embellish employment or income information, and then have state and federal revenue services send tax refunds to the fraudsters or resources controlled by or accessible by the fraudsters. Sometimes a fraudulent tax return is difficult to detect because the fraudulently provided information does not, on its own, appear unreasonable. However, by comparing the data entry characteristics of fraudulently provided information to the data entry characteristics of a plurality of prior tax returns, the disclosed methods and systems are able to identify potential fraud activity and take one or more risk reduction actions to protect the owner of the tax filer identifier, according to one embodiment.

Introductory System

As used herein, the term data management system (e.g., a tax return preparation system or other software system) includes, but is not limited to the following: one or more of computing system implemented, online, web-based personal and business tax return preparation system; one or more of computing system implemented, online, web-based personal or business financial management systems, services, packages, programs, modules, or applications; one or more of computing system implemented, online, and web-based personal or business management systems, services, packages, programs, modules, or applications; one or more of computing system implemented, online, and web-based personal or business accounting or invoicing systems, services, packages, programs, modules, or applications; and various other personal or business electronic data management systems, services, packages, programs, modules, or applications, whether known at the time of filing or as developed after the time of filing.

Specific examples of data management systems include financial management systems. Examples of financial management systems include, but are not limited to the following: TurboTax® available from Intuit®, Inc. of Mountain View, Calif.; TurboTax Online™ available from Intuit®, Inc. of Mountain View, Calif.; QuickBooks®, available from Intuit®, Inc. of Mountain View, Calif.; QuickBooks Online™, available from Intuit®, Inc. of Mountain View, Calif.; Mint®, available from Intuit®, Inc. of Mountain View, Calif.; Mint® Online, available from Intuit®, Inc. of Mountain View, Calif.; or various other systems discussed herein, or known to those of skill in the art at the time of filing, or as developed after the time of filing.

As used herein the term "tax return preparation system" is a financial management system that receives personal, business, and financial information from tax filers (or their representatives) and prepares tax returns for the tax filers, according to one embodiment.

As used herein, the terms "computing system," "computing device," and "computing entity," include, but are not limited to, the following: a server computing system; a workstation; a desktop computing system; a mobile computing system, including, but not limited to, one or more of smart phones, portable devices, and devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes or operations as described herein.

In addition, as used herein, the terms "computing system", "computing entity", and "computing environment" can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes or operations as described herein.

Herein, the term "production environment" includes the various components, or assets, used to deploy, implement, access, and use, a given system as that system is intended to be used. In various embodiments, production environments include multiple computing systems or assets that are combined, communicatively coupled, virtually or physically connected, or associated with one another, to provide the production environment implementing the application.

As specific illustrative examples, the assets making up a given production environment can include, but are not limited to, the following: one or more computing environments used to implement at least part of a system in the production environment such as a data center, a cloud computing environment, a dedicated hosting environment, or one or more other computing environments in which one or more assets used by the application in the production environment are implemented; one or more computing systems or computing entities used to implement at least part of a system in the production environment; one or more virtual assets used to implement at least part of a system in the production environment; one or more supervisory or control systems, such as hypervisors, or other monitoring and management systems used to monitor and control assets or components of the production environment; one or more communications channels for sending and receiving data used to implement at least part of a system in the production environment; one or more access control systems for limiting access to various components of the production environment, such as firewalls and gateways; one or more traffic or routing systems used to direct, control, or buffer data traffic to components of the production environment, such as routers and switches; one or more communications endpoint proxy systems used to buffer, process, or direct data traffic, such as load balancers or buffers; one or more secure communication protocols or endpoints used to encrypt/decrypt data, such as Secure Sockets Layer (SSL) protocols, used to implement at least part of a system in the production environment; one or more databases used to store data in the production environment; one or more internal or external services used to implement at least part of a system in the production environment; one or more backend systems, such as backend servers or other hardware used to process data and implement at least part of a system in the production environment; one or more modules/functions used to implement at least part of a system in the production environment; or any other assets/components making up an actual production environment in which at least part of a system is deployed, implemented, accessed, and run, e.g., operated, as discussed herein, or as known in the art at the time of filing, or as developed after the time of filing.

As used herein, the term "computing environment" includes, but is not limited to, a logical or physical grouping of connected or networked computing systems or virtual assets using the same infrastructure and systems such as, but not limited to, hardware systems, systems, and networking/communications systems. Typically, computing environments are either known, "trusted" environments or unknown, "untrusted" environments. Typically, trusted computing environments are those where the assets, infrastructure, communication and networking systems, and security systems associated with the computing systems or virtual assets making up the trusted computing environment, are either under the control of, or known to, a party.

In various embodiments, each computing environment includes allocated assets and virtual assets associated with, and controlled or used to create, deploy, or operate at least part of the system.

In various embodiments, one or more cloud computing environments are used to create, deploy, or operate at least part of the system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, as known in the art at the time of filing, or as developed after the time of filing.

In many cases, a given system or service may utilize, and interface with, multiple cloud computing environments, such as multiple VPCs, in the course of being created, deployed, or operated.

As used herein, the term "virtual asset" includes any virtualized entity or resource, or virtualized part of an actual, or "bare metal" entity. In various embodiments, the virtual assets can be, but are not limited to, the following: virtual machines, virtual servers, and instances implemented in a cloud computing environment; databases associated with a cloud computing environment, or implemented in a cloud computing environment; services associated with, or delivered through, a cloud computing environment; communications systems used with, part of, or provided through a cloud computing environment; or any other virtualized assets or sub-systems of "bare metal" physical devices such as mobile devices, remote sensors, laptops, desktops, point-of-sale devices, etc., located within a data center, within a cloud computing environment, or any other physical or logical location, as discussed herein, or as known/available in the art at the time of filing, or as developed/made available after the time of filing.

In various embodiments, any, or all, of the assets making up a given production environment discussed herein, or as known in the art at the time of filing, or as developed after the time of filing can be implemented as one or more virtual assets within one or more cloud or traditional computing environments.

In one embodiment, two or more assets, such as computing systems or virtual assets, or two or more computing environments are connected by one or more communications channels including but not limited to, Secure Sockets Layer (SSL) communications channels and various other secure communications channels, or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, or virtual assets, as discussed herein, or available or known at the time of filing, or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, or computing systems, whether available or known at the time of filing or as later developed.

As used herein, the term "user experience display" includes not only data entry and question submission user interfaces, but also other user experience features and elements provided or displayed to the user such as, but not limited to, the following: data entry fields, question quality indicators, images, backgrounds, avatars, highlighting mechanisms, icons, buttons, controls, menus and any other features that individually, or in combination, create a user experience, as discussed herein, or as known in the art at the time of filing, or as developed after the time of filing.

As used herein, the term "user experience" includes, but is not limited to, one or more of a user session, interview process, interview process questioning, or interview process questioning sequence, or other user experience features provided or displayed to the user such as, but not limited to, interfaces, images, assistance resources, backgrounds, avatars, highlighting mechanisms, icons, and any other features that individually, or in combination, create a user experience, as discussed herein, or as known in the art at the time of filing, or as developed after the time of filing.

Herein, the term "party," "user," "user consumer," and "customer" are used interchangeably to denote any party or entity that interfaces with, or to whom information is provided by, the disclosed methods and systems described herein, or a legal guardian of person or entity that interfaces with, or to whom information is provided by, the disclosed methods and systems described herein, or an authorized agent of any party or person or entity that interfaces with, or to whom information is provided by, the disclosed methods and systems described herein. For instance, in various embodiments, a user can be, but is not limited to, a person, a commercial entity, an application, a service, or a computing system.

As used herein, the term "analytics model" denotes one or more individual or combined algorithms or sets of ordered relationships that describe, determine, or predict characteristics of or the performance of a datum, a data set, multiple data sets, a computing system, or multiple computing systems. Analytics models or analytical models represent collections of measured or calculated behaviors of attributes, elements, or characteristics of data or computing systems. Analytics models include predictive models, which identify the likelihood of one attribute or characteristic based on one or more other attributes or characteristics.

As used herein a "risk score" quantifies or metricizes (i.e., makes measureable) the amount of risk calculated to be associated with a tax return, with the computing system that is used to prepare the tax return, or with the user of the tax return preparation system that is providing information for the preparation of the tax return.

As used herein "tax return content" denotes user (person or business) characteristics and financial information for a tax filer, according to various embodiments.

As used herein the term "system access information" denotes data that represents the activities of a user during the user's interactions with a tax return preparation system, and represents system access activities and the features or characteristics of those activities, according to various embodiments.

As used herein the term "data entry characteristics" denotes information that represents the manner in which tax return content (represented by tax return content data) is provided to or entered into a tax return preparation system, according to one embodiment.

As used herein, the term "risk categories" denotes characteristics, features, or attributes of tax return content, users, or client computing systems, and represents subcategories of risk that may be transformed into a risk score to quantify potentially fraudulent activity, according to various embodiments.

As used herein, the term "stolen identity refund fraud" ("SIRF") denotes a creation of a tax return preparation system account using a tax filer identifier (e.g., name, birth date, Social Security Number, etc.) of an owner (e.g., person, business, or other entity) without the permission of the owner of the tax filer identifier, according to one embodiment. Stolen identity refund fraud is one technique that is employed by cybercriminals to obtain tax refunds from state and federal revenue agencies, according to one embodiment.

Hardware Architecture

FIG. 1 is an example block diagram of a production environment 100 for identifying potential fraud activity in a tax return preparation system, at least partially based on data entry characteristics of tax return content provided to the tax return preparation system, according to one embodiment. The production environment 100 includes a service provider computing environment 110 and user computing systems 150, according to one embodiment. The service provider computing environment 110 includes a tax return preparation system 111 and a security system 112 for identifying potential fraud activity in the tax return preparation system 111, at least partially based on data entry characteristics of tax return content provided to the tax return preparation system, according to one embodiment. The service provider computing environment 110 is communicatively coupled to the user computing systems 150 over a communications channel 101, according to one embodiment. The communications channel 101 represents one or more local area networks, the Internet, or a combination of one or more local area networks and the Internet, according to various embodiments.

The tax return preparation system 111 and the security system 112 determine a level of risk (e.g., a risk score) that is associated with a new tax return, at least partially based on data entry characteristics of tax return content provided to the tax return preparation system, according to one embodiment. Some techniques for determining the level of risk or the risk score for a new tax return include analyzing characteristics of the user computing system that was used to access the tax return preparation system to prepare the tax return. However, sometimes the characteristics of the user computing system are not suspicious enough to increase the level of risk or change the risk score to a level that is detectable by an analytics model as potential fraud. To overcome this potential deficiency, the tax return preparation system 111 and the security system 112 determine the risk score based on an analysis of new tax return content of a new tax return, according to one embodiment. However, sometimes the new tax return content of a new tax return is not suspicious enough to increase the level of risk or change the risk score to a level that is detectable by an analytics model as potent fraud. To overcome this potential deficiency, the tax return preparation system 111 and the security system 112 determine the risk score by analyzing new tax return content of a new tax return in the context of prior tax return content of one or more prior tax returns for a particular tax filer identifier, according to one embodiment. In other words, the tax return preparation system 111 and the security system 112 analyze both the new tax return content of a new tax return and the prior tax return content of one or more prior tax returns for a particular tax filer identifier to determine if deviations between the new and prior tax return content is potentially fraudulent, according to one embodiment.

If the new tax return content of a new tax return is not suspicious, potentially fraudulent activity can be detected by analyzing the manner in which the new tax return content is provided to the tax return preparation system, according to one embodiment. The tax return preparation system 111 and the security system 112 determine the risk score by analyzing data entry characteristics that represent how the new tax return content for the new tax return is provided to the tax return preparation system 111, according to one embodiment. Analysis of the data entry characteristics identifies patterns or other indicia of manual or automated entry of new tax return content by fraudulent users, according to one embodiment.

The security system 112 increases the risk score (e.g., likelihood of potential fraud) with increased indication (e.g., detection of a pattern) that the data entry characteristics are representative of manual entry of the new tax return content to the tax return preparation system 111 by fraudulent users, according to one embodiment. For example, by training one or more analytics models with a training data set (e.g., existing tax return content that has been identified as being provided to the tax return preparation system 111 by fraudulent users), the security system 112 may determine that the data entry characteristics of new tax return content are similar to or are likely to be associated with fraudulent users. Some of the data entry characteristics that are used to identify fraudulent user patterns include, but are not limited to, areas of the tax experience visited in a specific order, particular ways or speeds of entering data, commonalities in usage pattern, and other characteristics that are usage patterns or usage signatures of fraudulent users, according to various embodiments.

The security system 112 increases the risk score (e.g., likelihood of potential fraud) with increased indication that the data entry characteristics are representative of a script or automated tool being used to provide the new tax return content to the tax return preparation system 111, according to one embodiment. A script or other automated tool is highly unlikely to be used by a legitimate or non-fraudulent user to enter new tax return content into a tax return preparation system because it may take just as long to program or create a script to automate data entry as it would to manually enter the data. Furthermore, many (if not most) non-fraudulent users of the tax return preparation system do not have the technical skills to create such a script. Consequently, usage patterns or usage signatures that are indicative of the use of scripts or other tools to automate data entry into a tax return preparation system are treated as highly suspicious, because automated data entry is more likely to be used by fraudsters than legitimate users to efficiently prepare and file tax returns (e.g., numerous tax returns).

In one embodiment, the tax return preparation system 111 and the security system 112 determine the level of risk or the risk score of a new tax return based on one or more of data entry characteristics, new tax return content, prior tax return content, and system access information, according to one embodiment. Specific techniques for determining a risk score with system access information are disclosed in related U.S. patent application Ser. No. 15/220,714, filed Jul. 27, 2016, and titled "METHOD AND SYSTEM FOR IDENTIFYING AND ADDRESSING POTENTIAL STOLEN IDENTIFY REFUND FRAUD ACTIVITY IN A FINANCIAL SYSTEM", which is incorporated by reference herein in its entirety.

The user computing systems 150 represent one or more user computing systems that are used by users 152 to access services that are provided by the service provider computing environment 110, according to one embodiment. The users 152 include legitimate users 154 and fraudulent users 156, according to one embodiment. The legitimate users 154 are tax filers who access the tax return preparation system 111, which is hosted by the service provider computing environment 110, to legally prepare, submit, and file a tax return, according to one embodiment. Fraudulent users 156 are users who illegally use tax filer identifiers or other information belonging to other people or entities to prepare and submit a tax return, according to one embodiment. One technique the fraudulent users 156 use for preparing illegal tax returns is to use scripts to automate submission of tax return content to the tax return preparation system 111.

The users 152 interact with the tax return preparation system 111 to provide new tax return content 159 to the tax return preparation system 111, and the new tax return content 159 is added to tax return content 158 that is stored and maintained by the tax return preparation system 111, according to one embodiment. The new tax return content 159 is represented by tax return content data, according to one embodiment. The new tax return content 159 includes user characteristics and financial information that is provided to the tax return preparation system 111 to facilitate preparing a tax return, according to one embodiment. While the users 152 interact with the tax return preparation system 111, the tax return preparation system 111 collects new data entry characteristics of new tax returns 130 and user system characteristics 160 that are associated with the users 152. One or more of the new data entry characteristics of new tax returns 130, the tax return content 158, and the user system characteristics 160 are used by the tax return preparation system 111 or by the security system 112 to at least partially determine a risk score for a tax return, according to one embodiment.

The service provider computing environment 110 provides the tax return preparation system 111 and the security system 112 to enable the users 152 to conveniently file tax returns, and to identify and reduce the risk of fraudulent tax return filings, according to one embodiment. The tax return preparation system 111 progresses users through a tax return preparation interview to acquire tax return content, to acquire new data entry characteristics of new tax returns, to prepare tax returns for users, and to assist users in obtaining tax credits or tax refunds, according to one embodiment. The security system 112 uses the new data entry characteristics of new tax returns, new tax return content, prior tax return content, and other information collected about the users 152 and about the user computing systems 150 to determine a risk score for each new tax return prepared with the tax return preparation system 111, according to one embodiment. Once the security system 112 determines that the risk score for a particular new tax return is indicative of fraudulent activity (e.g., if the risk score exceeds a threshold), the security system 112 performs one or more risk reduction actions (e.g., notifying users, delaying filing the new tax return, helping legitimate users cancel fraudulent tax returns, etc.), according to various embodiments.

The tax return preparation system 111 uses a tax return preparation engine 113 to facilitate preparing tax returns for users, according to one embodiment. The tax return preparation engine 113 provides a user interface 114, by which the tax return preparation engine 113 delivers user experience elements 115 to users to facilitate receiving the new tax return content 159 from the users 152, according to one embodiment. The tax return preparation engine 113 uses the new tax return content 159 to prepare a tax return 117, and to (when applicable) assist users in obtaining a tax refund 118 from one or more state and federal revenue agencies, according to one embodiment. The tax return preparation engine 113 updates the tax return content 158 to include the new tax return content 159, while or after the new tax return content 159 is received by the tax return preparation system 111, according to one embodiment. The tax return preparation engine 113 populates the user interface 114 with user experience elements 115 that are selected from interview content 119, according to one embodiment. The interview content 119 includes questions, tax topics, content sequences, and other user experience elements for progressing users through a tax return preparation interview, to facilitate the preparation of the tax return 117 for each user, according to one embodiment.

The tax return preparation system 111 (e.g., the tax return preparation engine 113) or the security system 112 also records the new data entry characteristics of new tax returns 130 while the users 152 or while the user computing systems 150 provide the new tax return content 159 to the tax return preparation system 111, according to one embodiment. The tax return preparation system 111 or the security system 112 stores the new data entry characteristics of new tax returns 130 in the tax return content 158, according to one embodiment. Previously acquired data entry characteristics for the prior tax returns 134 are stored as prior data entry characteristics of prior tax returns 131 in the tax return content 158, according to one embodiment.

The tax return preparation system 111 stores the tax return content 158 in a tax return content database 157, for use by the tax return preparation system 111 and for use by the security system 112, according to one embodiment. The tax return content 158 is a table, database, or other data structure, according to one embodiment. The tax return content 158 includes user characteristics 116 and financial information 120, according to one embodiment. The tax return content 158 includes the new tax return content 159 that is received for new tax returns 133 and includes tax return content that is received for prior tax returns 134 (e.g., already filed tax returns), which are both associated with user accounts 135 and with tax filer identifiers 136, according to one embodiment. The tax return content 158 includes the new data entry characteristics of new tax returns 130 that is recorded for the new tax returns 133 and includes prior data entry characteristics of prior tax returns 131 (e.g., already filed tax returns), which are both associated with user accounts 135 and with tax filer identifiers 136, according to one embodiment.

The user characteristics 116 are represented by user characteristics data and the financial information 120 is represented by financial information data, according to one embodiment. The user characteristics 116 and the financial information 120 are personally identifiable information ("PII"), according to one embodiment. The user characteristics 116 and the financial information 120 include, but are not limited to, data representing: type of web browser, type of operating system, manufacturer of computing system, whether the user's computing system is a mobile device or not, a user's name, a Social Security number, government identification, a driver's license number, a date of birth, an address, a zip code, a home ownership status, a marital status, an annual income, a job title, an employer's address, spousal information, children's information, asset information, medical history, occupation, information regarding dependents, salary and wages, interest income, dividend income, business income, farm income, capital gain income, pension income, individual retirement account ("IRA") distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, account identifiers, bank accounts, prior tax returns, the financial history of users of the tax return preparation system 111, and any other information that is currently used, that can be used, or that may be used in the future, in a tax return preparation system or in providing one or more tax return preparation services, according to various embodiments. According to one embodiment, the security system 112 uses one or more of the user characteristics 116 and the financial information 120 of a new tax return and of one or more prior tax returns 134 to determine a likelihood that a new tax return is fraudulent, even if characteristics of a user computing system are not indicative of potential fraud, according to one embodiment.

The new tax returns 133 represent tax returns that have not been filed by the tax return preparation system 111 with a state or federal revenue agency, according to one embodiment. The new tax returns 133 are associated with portions of the tax return content 158 (e.g., the new tax return content 159) that have not been filed by the tax return preparation system 111 with a state or federal revenue agency, according to one embodiment. The new tax returns 133 are tax returns that the users 152 are in the process of completing, either in a single user session or in multiple user sessions with the tax return preparation system 111, according to various embodiments. The new tax returns 133 are tax returns that the users 152 have submitted to the tax return preparation system 111 for filing with one or more state and federal revenue agencies and that the tax return preparation system 111 has not filed with a state or federal revenue agency, according to one embodiment.

Each of the new tax returns 133 are prepared within the tax return preparation system 111 with one of the user accounts 135, according to one embodiment. The users 152 sign into the tax return preparation system 111 with a newly created or previously used one of the user accounts 135 and provide the new tax return content 159 for the new tax returns 133, according to one embodiment.

Each of the new tax returns 133 is associated with one or more of the tax filer identifiers 136, according to one embodiment. Examples of tax filer identifiers 136 include, but are not limited to, a Social Security Number ("SSN"), an Individual Taxpayer Identification Number ("ITIN"), an Employer Identification Number ("EIN"), an Internal Revenue Service Number ("IRSN"), a foreign tax identification number, a name, a date of birth, a passport number, a driver's license number, a green card number, and a visa number, according to various embodiments. One or more of the tax filer identifiers 136 are provided by the users 152 (e.g., within the new tax return content 159) while preparing the new tax returns 133, according to one embodiment. A single one of the tax filer identifiers 136 can be used with multiple ones of the user accounts 135, according to one embodiment. For example, one of the legitimate users 154 can create one of the user accounts 135 with his or her SSN one year and then create another one of the user accounts 135 in a subsequent year (e.g., because the user forgot his or her credentials). As a problematic example, one of the legitimate users 154 can create one of the user accounts 135 with his or her SSN one year, and one of the fraudulent users 156 can create another (i.e., fraudulent) one of the user accounts 135 in a subsequent year using the same SSN (which is what the security system 112 is configured to identify and address), according to one embodiment.

The prior tax returns 134 represent tax returns that have been filed by the tax return preparation system 111 with one or more state and federal revenue agencies, according to one embodiment. The prior tax returns 134 are associated with portions of the tax return content 158 (e.g., prior tax return content) that was one or more of received by and filed by the tax return preparation system 111 with one or more state and federal revenue agencies, according to one embodiment. One or more of the prior tax returns 134 are imported into the tax return preparation system 111 from one or more external sources, e.g., a tax return preparation system provided by another service provider, according to one embodiment. The prior tax returns 134 are tax returns that the users 152 prepared in one or more prior years (with reference to a present year), according to one embodiment.

The prior tax returns 134 include a subset of tax returns that are fraudulent tax returns 137, according to one embodiment. The fraudulent tax returns 137 are tax returns that were identified as being fraudulent by one or more legitimate users 154 to the service provider of the tax return preparation system 111, according to one embodiment. The fraudulent tax returns 137 are tax returns that were identified as being fraudulent by one or more state and federal revenue agencies (e.g., in a fraudulent tax return filing report), according to one embodiment. At least some of the fraudulent tax returns 137 have been filed with one or more state and federal revenue agencies by the tax return preparation system 111, according to one embodiment.

Each of the prior tax returns 134 are associated with one of the user accounts 135, according to one embodiment. Each of the prior tax returns 134 are associated with one of the user accounts 135 that was used to prepare the prior tax returns 134 within the tax return preparation system 111, according to one embodiment. In one embodiment, one or more of the prior tax returns 134 have tax return content that is imported into the tax return preparation system 111 after having been filed with one or more state and federal revenue agencies, and was not prepared and filed with the tax return preparation system 111.

Each of the prior tax returns 134 is associated with one or more of the tax filer identifiers 136, according to one embodiment.

The new data entry characteristics of new tax returns 130 and the prior data entry characteristics of prior tax returns 131 are data entry characteristics that identify the manner in which tax return content is provided to the tax return preparation system 111, according to one embodiment. The tax return preparation system 111 or the security system 112 use the data entry characteristics to determine a likelihood of potential fraudulent activity associated with a tax return, according to one embodiment. In one embodiment, the tax return preparation system 111 or the security system 112 use the data entry characteristics to define and identify usage patterns or usage signatures to determine a likelihood of potential fraudulent activity associated with a tax return. Usage patterns and usage signatures are combinations of data entry characteristics that are created when a user enters data into the tax return preparation system 111 and that are detected by analyzing the data entry characteristics for data entered into the tax return preparation system, according to one embodiment. The data entry characteristics include, but are not limited to, tabbing (versus clicking) to progress through input fields of the tax return preparation system, clicking to progress through input fields of the tax return preparation system, pasting (versus typing) new tax return content into input fields of the tax return preparation system, typing new tax return content into input fields of the tax return preparation system, using a script to insert new tax return content into input fields of the tax return preparation system, speed of entering new tax return content into input fields of the tax return preparation system (e.g., 50 words per minute), characteristics of mouse cursor progression between input fields of the tax return preparation system (e.g., a precise straight line verses a less precise movement), total amount of mouse cursor movement within the tax return preparation system, consistency in duration of mouse clicks from a user (e.g., every mouse click is 0.3 seconds), duration of mouse clicks, consistency of location of mouse clicks within input fields of the tax return preparation system (e.g., 10 pixels down and 10 pixels to the right/left of an input field perimeter), which ones of a plurality of user experience pages the user accesses, an order in which some of a plurality of user experience pages are accessed, and duration of access of individual ones of user experience pages (e.g., 3 seconds per page), according to various embodiments.

The tax return preparation system 111 acquires and stores system access information 121 in a table, database, or other data structure, for use by the tax return preparation system 111 and for use by the security system 112, according to one embodiment. The system access information 121 includes, but is not limited to, data representing one or more of: user system characteristics, IP addresses, tax return filing characteristics, user account characteristics, session identifiers, and user credentials, according to one embodiment. The system access information 121 is defined based on the user system characteristics 160, according to one embodiment. The user system characteristics 160 include one or more of an operating system, a hardware configuration, a web browser, information stored in one or more cookies, the geographical history of use of a user computing system, an IP address, and other forensically determined characteristics/attributes of a user computing system, according to one embodiment. The user system characteristics 160 are represented by a user system characteristics identifier that corresponds with a particular set of user system characteristics during one or more of the sessions with the tax return preparation system 111, according to one embodiment. Because a user computing system may use different browsers or different operating systems at different times to access the tax return preparation system 111, the user system characteristics 160 for each of the user computing systems 150 may be assigned several user system characteristics identifiers, according to one embodiment. The user system characteristics identifiers are called the visitor identifiers ("VIDs") and are shared between each of the service provider systems within the service provider computing environment 110, according to one embodiment.

The service provider computing environment 110 uses the security system 112 to identify and address potential fraud activity in the tax return preparation system 111, according to one embodiment. The tax return 117 is an example of one of the new tax returns 133, according to one embodiment. The security system 112 requests or acquires information from the tax return preparation system 111 and determines the likelihood of potential fraud activity for the tax return 117, at least partially based on the new data entry characteristics of new tax returns 130 of the tax return content 158 for the tax return 117, according to one embodiment. The security system 112 is part of the same service provider computing environment as the tax return preparation system 111, and therefore obtains access to the new data entry characteristics of new tax returns 130 and the system access information 121, by generating one or more data requests (e.g., database queries) in the service provider computing environment 110, according to one embodiment.

The security system 112 uses an analytics module 122 to analyze one or more of the new data entry characteristics of new tax returns 130, the tax return content 158 for the tax return 117, and the system access information 121 to determine a risk score 123 for the tax return 117, according to one embodiment. The security system 112 applies one or more of the new data entry characteristics of new tax returns 130, the tax return content 158 for the tax return 117, and the system access information 121 to an analytics model 125 to generate or determine the risk score 123 for the tax return 117, according to one embodiment. In one embodiment, the risk score 123 is at least partially based on a comparison of one or more existing usage patterns or usage signatures (e.g., fraudulent usage signatures) with one or more new usage patterns or usage signatures associated with one or more of the new data entry characteristics of new tax returns 130 and the system access information 121. The risk score 123 represents a likelihood of potential stolen identity refund fraud or fraud activity for one or more risk categories 124 associated with the tax return 117, according to one embodiment.

The analytics module 122 transforms one or more of the new data entry characteristics of new tax returns 130, the tax return content 158 for the tax return 117, and the system access information 121 into the risk score 123, according to one embodiment. The analytics module 122 applies one or more of the new data entry characteristics of new tax returns 130, the tax return content 158 for the tax return 117, and the system access information 121 to the analytics model 125 in order to generate the risk score 123, according to one embodiment. In one embodiment, the analytics model 125 transforms input data into the risk score 123, which represents one or more risk scores for one or more risk categories 124 for the tax return 117. If the analytics model 125 includes multiple analytics models, each of the analytics models of the analytics model 125 generates a risk score 123 that is associated with a single one of the risk categories 124, and multiple risk scores are combined to determine the risk score 123, according to one embodiment. The risk categories 124 include, but are not limited to, script-based data entry, change in destination bank account for tax refund, email address, claiming disability, deceased status, type of filing (e.g., 1040A, 1040EZ, etc.), number of dependents, refund amount, percentage of withholdings, total sum of wages claimed, user system characteristics, IP address, user account, occupation (some occupations are used more often by fraudsters), occupations included in tax returns filed from a particular device, measurements of how fake an amount is in a tax filing (e.g., if all fields end in "0.00"), phone numbers, the number of states claimed in the tax return, the complexity of a tax return, the number of dependents, the age of dependents, age of the tax payer, the age of a spouse the tax payer, and special fields within a tax return (e.g., whether it tax filer has special needs), according to various embodiments.

As a specific illustrative example of how the analytics model 125 may detect potential fraud in a new tax return, if the new data entry characteristics of new tax returns 130 indicates that words are pasted into input fields at 500 words per minute (when the average may be 30 words per minute), the time on a user experience page is 20 seconds (when the average may be 9 minutes), and every mouse click is precisely in the same location in all input fields in user experience pages, then the analytics model 125 generates a risk score 123 that is indicative of script-based data entry.

The analytics model 125 includes a data entry characteristics model 139 and a system access information model 140 that are used in combination to determine the risk score 123, according to one embodiment. The data entry characteristics model 139 is a first analytics model and the system access information model 140 is a second analytics model, according to one embodiment. In one embodiment, the analytics model 125 includes multiple sub-models that are analytics models that work together to generate the risk score 123 at least partially based on the tax return content 158 and the system access information 121, according to one embodiment. In one embodiment, the data entry characteristics model 139 generates a partial risk score 123 that is based on the new data entry characteristics of new tax returns 130, according to one embodiment. In one embodiment, the system access information model 140 generates a partial risk score 123 that is based on the system access information 121, according to one embodiment. The two partial risk scores are one or more of combined, processed, and weighted to generate the risk score 123, according to one embodiment. If the security system 112 only applies the new data entry characteristics of new tax returns 130 to the analytics model 125, the risk score 123 represents a likelihood of potential stolen identity refund fraud or fraud activity that is solely based on the new data entry characteristics of new tax returns 130, according to one embodiment. If the security system only applies system access information 121 to the analytics model 125, the risk score 123 represents a likelihood of potential stolen identity refund fraud or fraud activity that is solely based on the system access information 121, according to one embodiment. The security system 112 is configured to apply one or more available portions of the new data entry characteristics of new tax returns 130, the tax return content 158, and one or more available portions of the system access information 121 to the analytics model 125, which generates the risk score 123 for the tax return 117 that is representative of the one or more available portions of information that is received, according to one embodiment. Thus, the risk score 123 is determined based on whole or partial new data entry characteristics of new tax returns 130, tax return content 158, and system access information 121 for the tax return 117, according to one embodiment.

The analytics model 125 is trained using information from the tax return preparation system 111 that has been identified or reported as being linked to some type of fraudulent activity, according to one embodiment. Customer service personnel or other representatives of the service provider receive complaints from a user when the user accounts for the tax return preparation system 111 do not work as expected or anticipated (e.g., a tax return has been filed from a user's account without their knowledge). When customer service personnel look into the complaints, they occasionally identify user accounts that have been created under another person's or other entity's name or other tax filer identifier, without the owner's knowledge. By obtaining identity information of a person or entity, a fraudster may be able to create fraudulent user accounts and create or file tax returns with stolen identity information without the permission of the owner of the identity information. When an owner of the identity information creates or uses a legitimate user account to prepare or file a tax return, the owner of the identity information may receive notification that a tax return has already been prepared or filed for their tax filer identifier. A complaint about such a situation is identified or flagged for potential or actual stolen identity refund fraud activity, according to one embodiment. One or more analytics model building techniques is applied to the prior data entry characteristics of prior tax returns 131, the fraudulent tax returns 137, and the system access information 121 to generate the analytics model 125 for one or more of the risk categories 124, according to one embodiment. The analytics model 125 is trained with a training data set that includes or consists of one or more of the prior data entry characteristics of prior tax returns 131, the fraudulent tax returns 137, and the system access information 121, according to one embodiment. The analytics model 125 is trained using one or more of a variety of machine learning techniques including, but not limited to, regression, logistic regression, decision trees, artificial neural networks, support vector machines, linear regression, nearest neighbor methods, distance based methods, naive Bayes, linear discriminant analysis, k-nearest neighbor algorithm, or another mathematical, statistical, logical, or relational algorithm to determine correlations or other relationships between the likelihood of potential stolen identity refund fraud activity and one or more of the prior data entry characteristics of prior tax returns 131, the tax return content 158 of one or more prior tax returns 134, and the system access information 121, according to one embodiment.

The security system 112 uses a risk reduction module 126 to perform one or more risk reduction actions 127, in response to determining that potential stolen identity refund fraud activity is occurring or has occurred in the tax return preparation system 111 for the tax return 117, according to one embodiment. The risk reduction module 126 receives alerts 128, the risk score 123, or other notifications that potential stolen identity refund fraud activity has occurred, according to one embodiment. The risk reduction module 126 uses risk reduction content 129 (e.g., messages, multimedia, telecommunications messages, etc.) to perform one or more of the risk reduction actions 127, according to one embodiment.

The risk reduction actions 127 include delaying filing of the tax return 117, if the security system 112 determines that the tax return 117 is likely fraudulent. In one embodiment, the security system 112 delays filing the tax return 117 with one or more federal and state revenue agencies for up to 72 hours while working with the users 152 to distinguish a legitimate user for the tax return 117 from a fraudulent user associated with the tax return 117 according to one embodiment.

The risk reduction actions 127 include transmitting an email message to one or more email addresses associated with a particular tax filer identifier, according to one embodiment. If multiple email addresses are associated with a particular tax filer identifier, the security system 112 may transmit a message to the email address that is associated with the tax filer identifier in one or more previous years, to allow a legitimate user associated with the tax return 117 to prove that the tax return 117 is fraudulent, according to one embodiment. If the legitimate user is able to provide sufficient evidence that proves that the tax return 117 is fraudulent, the security system 112 or the tax return preparation system 111 enables the legitimate user to cancel filing the tax return 117, according to one embodiment. The risk reduction actions 127 include transmitting an email message to an email address that is believed to belong to a fraudulent user, if multiple accounts are created within the tax return preparation system 111 for a single tax filer identifier, to comply with federal or state revenue agency rules, according to one embodiment. However, the security system 112 or the tax return preparation system 111 transmits an email message to the person who is believed to be the legitimate user prior to transmitting an email message to the person who is believed to be the fraudulent user, according to one embodiment. The risk reduction actions 127 enable the tax return preparation system 111 to reduce the likelihood of fraudulent users 156 of being able to submit fraudulent tax return to state and federal agencies, according to one embodiment. Furthermore, notifying legitimate users 154 prior to or in a different manner than notifying the fraudulent users 156 enables the tax return preparation system 111 to confirm potential fraud activity and acquire authorization from the legitimate users 154 to cancel a fraudulent tax return, according to one embodiment. These techniques are advantageous in resolving the long standing need of reducing fraudulent tax return filings through tax return preparation systems, according to one embodiment.

The alerts 128 include one or more notifications that the risk score 123 exceeds one or more thresholds established by the security system 112, according to one embodiment. The risk score 123 is an indication of a likelihood of potential fraud activity associated with the tax return 117, according to one embodiment. The security system 112 compares the risk score 123 to a threshold or a risk threshold, according to one embodiment. If the risk score 123 exceeds the threshold, the tax return 117 is determined to be risky or to be potentially fraudulent, according to one embodiment. In response to the risk score 123 exceeding the threshold, the analytics module 122 generates one or more alerts 128 and provides the alerts 128 to the risk reduction module 126, to cause the risk reduction module 126 to perform one or more risk reduction actions 127, according to one embodiment.

The service provider computing environment 110 includes a decision engine 102 that is used to host services to various applications and systems within the service provider computing environment 110, according to one embodiment. The service provider computing environment 110 uses the decision engine 102 to host the security system 112 to provide security services to a second service provider system 103 and to a third service provider system 104, according to one embodiment. The second service provider system 103 is a personal finance management system, and the third service provider system 104 is a business finance management system, according to one embodiment.

In one embodiment, the decision engine 102 provides security services with the security system 112 to systems that are outside of the service provider computing environment 110 (e.g., to third party systems) by, for example, receiving user characteristics, financial information, and system access information and by providing a risk score, to facilitate determination of fraudulent activity by the outside systems.

The service provider computing environment 110 includes memory 105 and processors 106 for storing and executing data representing the tax return preparation system 111 and data representing the security system 112, according to one embodiment.

Although the features and functionality of the production environment 100 are illustrated or described in terms of individual or modularized components, engines, modules, models, databases/data stores, and systems, one or more of the functions of one or more of the components, engines, modules, models, databases/data stores, or systems are functionally combinable with one or more other described or illustrated components, engines, modules, models, databases/data stores, and systems, according to various embodiments. Each of the described engines, modules, models, databases/data stores, characteristics, user experiences, content, and systems are data that can be stored in memory 105 and executed by one or more of the processors 106, according to various embodiments.

In one embodiment, the security system 112 provides real-time stolen identity refund fraud identification and remediation services. Each time a user account is created or accessed, the tax return preparation system 111 executes or calls the services of the security system 112 to generate risk score 123 for the one of the user computing systems 150 that accesses the account or provides the new tax return content 159, according to one embodiment. In one embodiment, the security system 112 continuously or periodically (e.g., every 1, 5, 10, 15 minutes, etc.) applies one or more of the tax return content 158 (inclusive of the new tax return content 159) and the system access information 121 to the analytic model 125 to generate the risk score 123 for the tax return 117.

By receiving various information from the tax return preparation system 111, analyzing the received information, quantifying a likelihood of risk based on the information, and performing one or more risk reduction actions 127, the security system 112 works with the tax return preparation system 111 to improve the security of the tax return preparation system 111, according to one embodiment. In addition to improving the security of the tax return preparation system 111, the security system 112 protects financial interests of customers of the service provider, to maintain or improve consumer confidence in the security and functionality of the tax return preparation system 111, according to one embodiment. Furthermore, the security system 112 addresses the long-standing and Internet-centric problem of cyber criminals stealing and using the identity information of people and business entities to perform unauthorized actions (e.g., create user accounts and steal electronically transferable funds from legitimate/rightful owners), according to one embodiment.

Process

Figure 2:
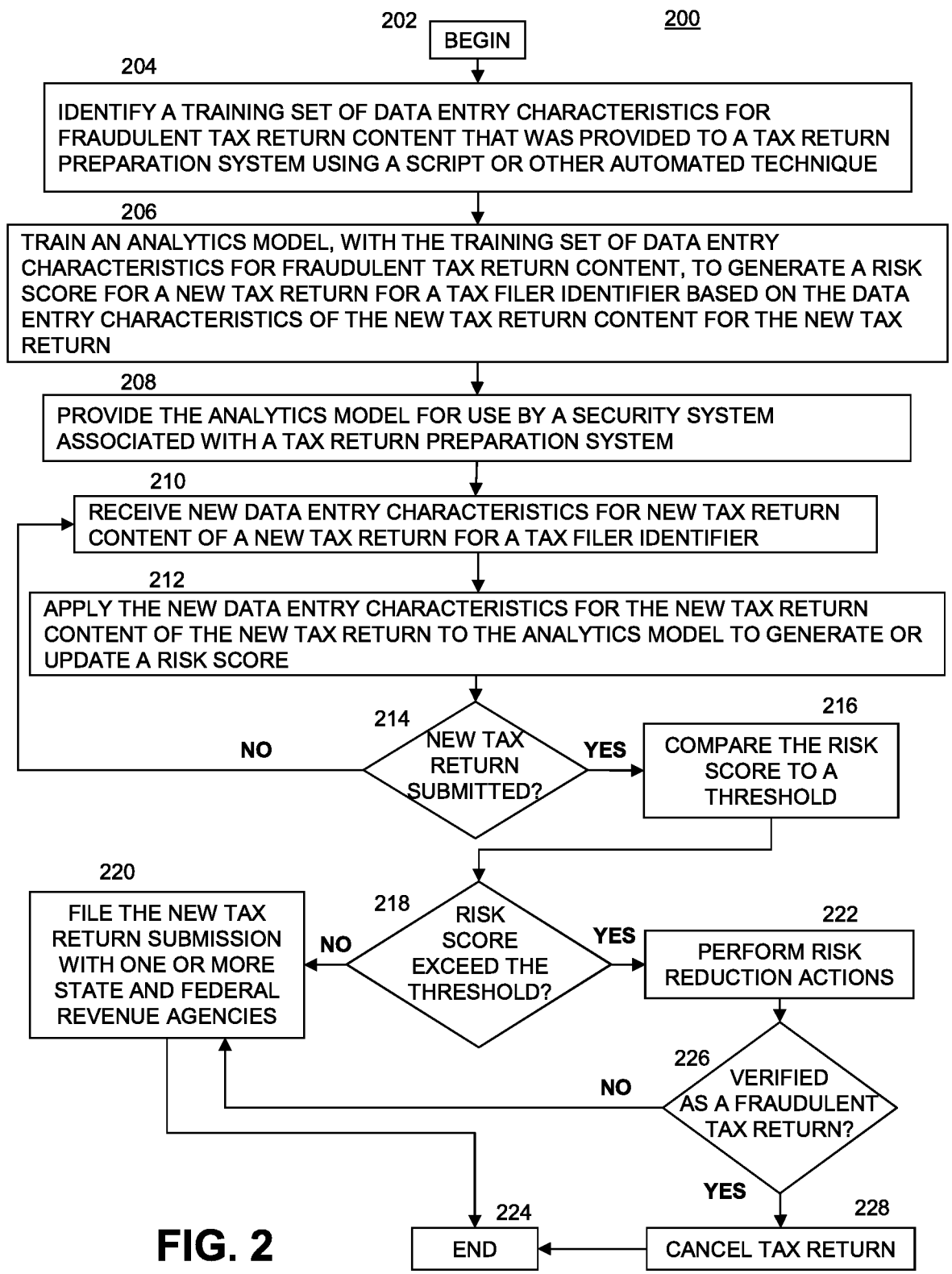
FIG. 2 is a flow diagram of a process for identifying potential fraud activity in a tax return preparation system, at least partially based on data entry characteristics of tax return content provided to the tax return preparation system, according to one embodiment.

FIG. 2 illustrates an example flow diagram of a process 200 for identifying potential fraud activity in a tax return preparation system, at least partially based on data entry characteristics of tax return content provided to the tax return preparation system, according to one embodiment.

At operation 202, the process 200 begins, according to one embodiment. Operation 202 proceeds to operation 204, according to one embodiment.

At operation 204, the process 200 identifies a training set of data entry characteristics for fraudulent tax return content that was provided to a tax return preparation system using a script or other automated technique, according to one embodiment. The training set of data entry characteristics for the fraudulent tax return content is at least partially determined by tax filers calling a service provider to notify the service provider that anomalous activity has been identified on the tax filers' accounts with the tax return preparation service provider, according to one embodiment. Operation 204 proceeds to operation 206, according to one embodiment.

At operation 206, the process 200 trains an analytics model, with the training set of data entry characteristics for fraudulent tax return content, to generate a risk score for a new tax return for a tax filer identifier based on the data entry characteristics of the new tax return content for the new tax return, according to one embodiment. Operation 206 proceeds to operation 208, according to one embodiment.

At operation 208, the process 200 provides the analytics model for use by a security system associated with a tax return preparation system, according to one embodiment. Operation 208 proceeds to operation 210, according to one embodiment.

At operation 210, the process 200 receives new data entry characteristics for new tax return content of a new tax return for a tax filer identifier, according to one embodiment. Operation 210 proceeds to operation 212, according to one embodiment.

At operation 212, the process 200 applies the new data entry characteristics for the new tax return content of the new tax return to the analytics model to generate or update a risk score, according to one embodiment. Operation 212 proceeds to operation 214, according to one embodiment.

At operation 214, the process 200 determines if a tax return has been submitted, according to one embodiment. A tax return is submitted to the tax return preparation system when a user requests that the tax return preparation system file the tax return with one or more state and federal revenue agencies. If a tax return has not been submitted (e.g., a user is continuing to provide tax return content), operation 214 returns to operation 210, according to one embodiment. If a tax return has been submitted, operation 214 proceeds to operation 216, according to one embodiment.

At operation 216, the process 200 compares the risk score to a threshold, according to one embodiment. Operation 216 proceeds to operation 218, according to one embodiment.

At operation 218, the process 200 determines if the risk score exceeds the threshold, according to one embodiment. If the risk score does not exceed the threshold, operation 218 proceeds to operation 220, according to one embodiment. If the risk score exceeds the threshold, operation 218 proceeds to operation 222, according to one embodiment.

At operation 220, the process 200 files the new tax return submission with one or more state and federal revenue agencies, according to one embodiment. Operation 220 proceeds to operation 224, according to one embodiment.

At operation 224, the process 200 ends, according to one embodiment.

At operation 222, the process 200 performs risk reduction actions, according to one embodiment. Operation 222 proceeds to operation 226, according to one embodiment.

At operation 226, the process 200 determines if the tax return has been verified as being a fraudulent tax return, according to one embodiment. Verifying that a tax return is fraudulent includes receiving a telephone call or receiving additional identity confirmation information from a legitimate user and receiving confirmation from the legitimate user that the prepared tax return is fraudulent, according to one embodiment. If the tax return has been verified as being a fraudulent tax return, operation 226 proceeds to operation 228, according to one embodiment. If the tax return has not been verified as being a fraudulent tax return, operation 226 proceeds to operation 220, according to one embodiment.

At operation 228, the process 200 cancels the tax return, according to one embodiment. Canceling the tax return includes not filing the tax return with one or more state and federal revenue agencies, according to one embodiment. Operation 222 proceeds to operation 224, where the process 200 ends, according to one embodiment.

Figure 3A:
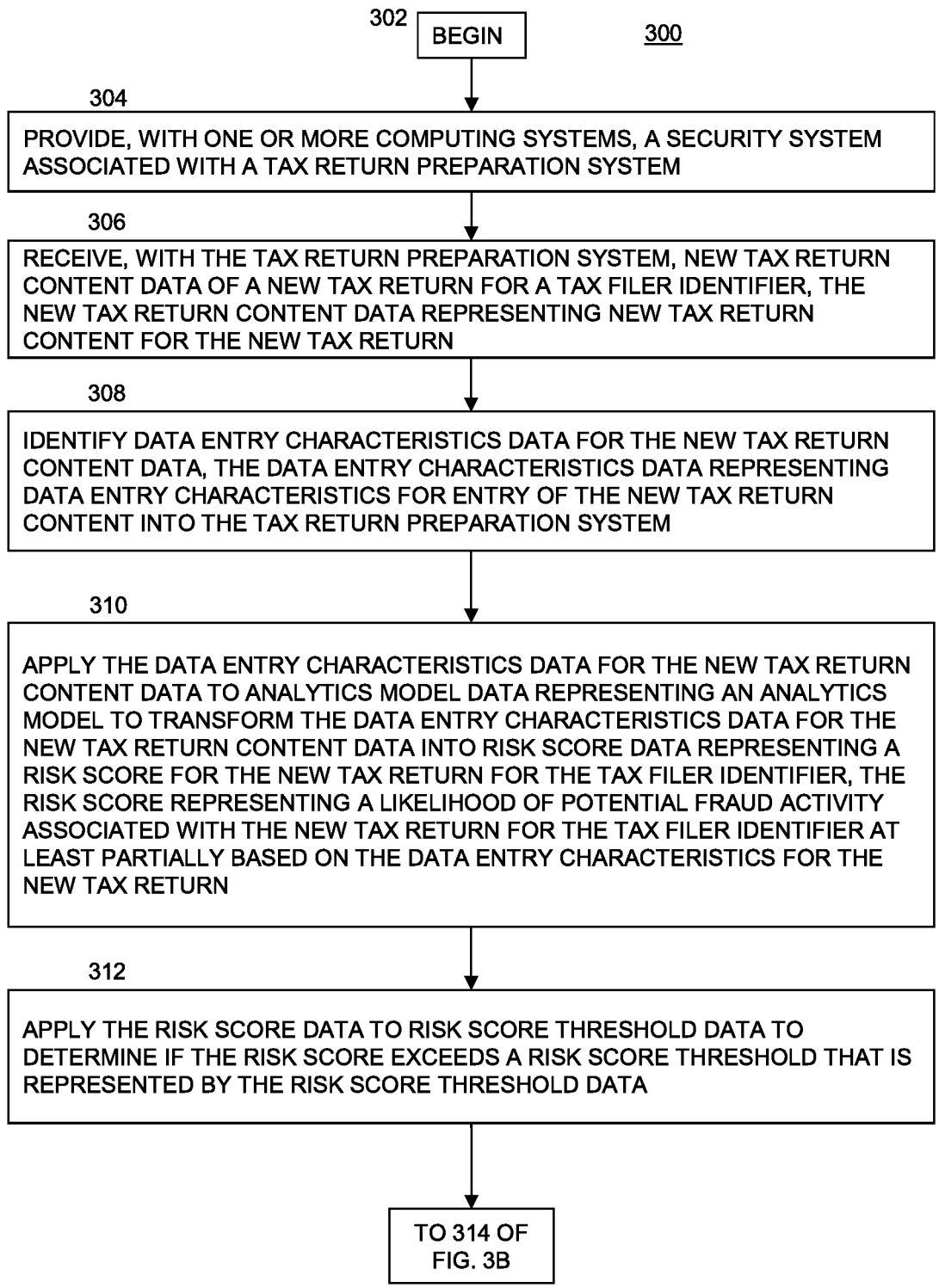
FIGS. 3A and 3B are a flow diagram of a process for identifying potential fraud activity in a tax return preparation system, at least partially based on data entry characteristics of tax return content provided to the tax return preparation system, according to one embodiment.
Figure 3B:
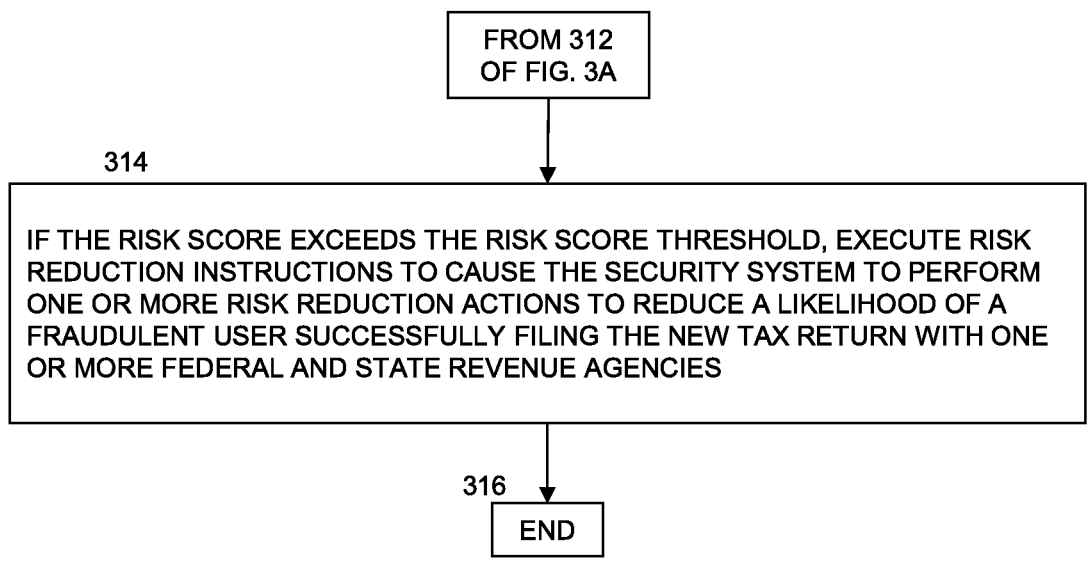

FIGS. 3A and 3B illustrate an example flow diagram of a process 300 for identifying potential fraud activity in a tax return preparation system, at least partially based on data entry characteristics of tax return content provided to the tax return preparation system, according to one embodiment.

At operation 302, the process 300 begins, according to one embodiment. Operation 302 proceeds to operation 304, according to one embodiment.

At operation 304, the process 300 provides, with one or more computing systems, a security system associated with a tax return preparation system, according to one embodiment. Operation 304 proceeds to operation 306, according to one embodiment.

At operation 306, the process 300 receives, with the tax return preparation system, new tax return content data of a new tax return for a tax filer identifier, the new tax return content data representing new tax return content for the new tax return, according to one embodiment. Operation 306 proceeds to operation 308, according to one embodiment.

At operation 308, the process 300 identifies data entry characteristics data for the new tax return content data, the data entry characteristics data representing data entry characteristics for entry of the new tax return content into the tax return preparation system, according to one embodiment. Operation 308 proceeds to operation 310, according to one embodiment.

At operation 310, the process 300 applies the data entry characteristics data for the new tax return content data to analytics model data representing an analytics model to transform the data entry characteristics data for the new tax return content data into risk score data representing a risk score for the new tax return for the tax filer identifier, the risk score representing a likelihood of potential fraud activity associated with the new tax return for the tax filer identifier at least partially based on the data entry characteristics for the new tax return, according to one embodiment. Operation 310 proceeds to operation 312, according to one embodiment.

At operation 312, the process 300 applies the risk score data to risk score threshold data to determine if the risk score exceeds a risk score threshold that is represented by the risk score threshold data, according to one embodiment. Operation 312 proceeds to operation 314 and FIG. 3B, according to one embodiment.

At operation 314, the process 300, if the risk score exceeds the risk score threshold, executes risk reduction instructions to cause the security system to perform one or more risk reduction actions to reduce a likelihood of a fraudulent user successfully filing the new tax return with one or more federal and state revenue agencies, according to one embodiment. Operation 314 proceeds to operation 316, according to one embodiment.

At operation 316, the process 300 ends, according to one embodiment.

As noted above, the specific illustrative examples discussed above are but illustrative examples of implementations of embodiments of the method or process for identifying and addressing potential stolen identity refund fraud activity in a tax return preparation system, at least partially based on data entry characteristics of tax return content provided to the tax return preparation system. Those of skill in the art will readily recognize that other implementations and embodiments are possible. Therefore, the discussion above should not be construed as a limitation on the claims provided below.

By identifying potential fraud activity in a tax return preparation system, at least partially based on data entry characteristics of tax return content, the present disclosure represents a technical solution to a long standing technical problem of stolen identify refund fraud in tax return preparation systems. Therefore, the disclosed embodiments do not represent an abstract idea for at least a few reasons. First, identifying potential fraud activity in a tax return preparation system, at least partially based on data entry characteristics of tax return content is not an abstract idea because it is not merely an idea itself (e.g., cannot be performed mentally or using pen and paper). Indeed, some of the disclosed embodiments of determining levels of risk include applying data representing tax return content to analytics models to generate data representing risk scores, which cannot be performed mentally. Second, identifying potential fraud activity in a tax return preparation system, at least partially based on data entry characteristics of tax return content is not an abstract idea because it is not a fundamental economic practice (e.g., is not merely creating a contractual relationship, hedging, mitigating a settlement risk, etc.). Third, identifying potential fraud activity in a tax return preparation system, at least partially based on data entry characteristics of tax return content is not an abstract idea because it is not a method of organizing human activity (e.g., managing a game of bingo). Fourth, although mathematics may be used to generate an analytics model, identifying potential fraud activity in a tax return preparation system at least partially based on data entry characteristics of tax return content is not simply a mathematical relationship/formula but is instead a technique for transforming data representing tax return content and tax return history into data representing a risk score, which quantifies the likelihood that a tax return is being fraudulently prepared or submitted, according to one embodiment.

Further, identifying potential fraud activity in a tax return preparation system, at least partially based on data entry characteristics of tax return content is not an abstract idea because the disclosed techniques allow for significant improvement to the technical fields of information security, fraud detection, and tax return preparation systems, according to one embodiment. The present disclosure adds significantly to the field of tax return preparation systems by reducing the risk of victimization in tax return filings and by increasing tax return preparation system users' trust in the tax return preparation system. This reduces the likelihood of users seeking other less efficient techniques (e.g., via a spreadsheet, or by downloading individual tax forms) for preparing and filing their tax returns.

As a result, embodiments of the present disclosure allow for reduced use of processor cycles, processor power, communications bandwidth, memory, and power consumption, by reducing a likelihood of fraudulent tax return filings and therefore reducing the likelihood of multiple tax returns being filed for a single person or entity, according to one embodiment. Consequently, computing and communication systems implementing or providing the embodiments of the present disclosure are transformed into more operationally efficient devices and systems.

In addition to improving overall computing performance, identifying potential fraud activity in a tax return preparation system helps maintain or build trust and therefore loyalty in the tax return preparation system, which results in repeat customers, efficient delivery of tax return preparation services, and reduced abandonment of use of the tax return preparation system, according to various embodiments.

In accordance with an embodiment, a computing system implemented method identifies potential fraud activity in a tax return preparation system, at least partially based on data entry characteristics of tax return content provided to the tax return preparation system. The method includes providing, with one or more computing systems, a security system associated with a tax return preparation system, according to one embodiment. The method includes receiving, with the tax return preparation system, new tax return content data of a new tax return for a tax filer identifier, the new tax return content data representing new tax return content for the new tax return, according to one embodiment. The method includes identifying data entry characteristics data for the new tax return content data, the data entry characteristics data representing data entry characteristics for entry of the new tax return content into the tax return preparation system, according to one embodiment. The method includes applying the data entry characteristics data for the new tax return content data to analytics model data representing an analytics model to transform the data entry characteristics data for the new tax return content data into risk score data representing a risk score for the new tax return for the tax filer identifier, the risk score representing a likelihood of potential fraud activity associated with the new tax return for the tax filer identifier at least partially based on the data entry characteristics for the new tax return, according to one embodiment. The method includes applying the risk score data to risk score threshold data to determine if the risk score exceeds a risk score threshold that is represented by the risk score threshold data, according to one embodiment. The method includes, if the risk score exceeds the risk score threshold, executing risk reduction instructions to cause the security system to perform one or more risk reduction actions to reduce a likelihood of a fraudulent user successfully filing the new tax return with one or more federal and state revenue agencies, according to one embodiment.

In accordance with an embodiment, a system identifies potential fraud activity in a tax return preparation system, at least partially based on data entry characteristics of tax return content provided to the tax return preparation system. The system includes a tax return content database that stores data entry characteristics data of new tax return content data for new tax returns for tax filer identifiers, according to one embodiment. The system includes a tax return preparation system engine that provides user experience content data to the users of a tax return preparation system to acquire the new tax return content data from the users to support preparing the new tax returns, and to extract the data entry characteristics data from the new tax return content data, according to one embodiment. The system includes an analytics model of a security system for the tax return preparation system, the analytics model being represented by analytics model data and being configured to transform the data entry characteristics data of the new tax return content data into risk score data in response to receipt of data entry characteristics data of the new tax return content data, the risk score data representing risk scores and representing a likelihood of fraud activity for the new tax returns, according to one embodiment. The system includes a risk reduction module that performs one or more risk reduction actions if one or more risk scores exceed a risk score threshold, to reduce a likelihood of fraudulent users successfully filing one or more of the new tax returns with one or more federal and state revenue agencies, according to one embodiment.

In accordance with an embodiment, a system identifies potential fraud activity in a tax return preparation system, at least partially based on data entry characteristics of tax return content provided to the tax return preparation system. The system includes one or more processors and memory, according to one embodiment. The memory includes data representing instructions which, if executed by the one or more processors, cause the one or more processors to perform a process for identifying potential fraud activity in a tax return preparation system, according to one embodiment. The system includes providing a security system associated with a tax return preparation system, according to one embodiment. The system includes receiving, with the tax return preparation system, new tax return content data of a new tax return for a tax filer identifier, the new tax return content data representing new tax return content for the new tax return, according to one embodiment. The system includes determining data entry characteristics data for the new tax return content data, the data entry characteristics data representing data entry characteristics for entry of the new tax return content into the tax return preparation system, according to one embodiment. The system includes applying the data entry characteristics data for the new tax return content data to analytics model data representing an analytics model to transform data entry characteristics data for the new tax return content data into risk score data representing a risk score for the new tax return for the tax filer identifier, the risk score representing a likelihood of potential fraud activity associated with the new tax return for the tax filer identifier at least partially based on the data entry characteristics for the new tax return, according to one embodiment. The system includes applying the risk score data to risk score threshold data to determine if the risk score exceeds a risk score threshold that is represented by the risk score threshold data, according to one embodiment. The system includes, if the risk score exceeds the risk score threshold, executing risk reduction instructions to cause the security system to perform one or more risk reduction actions to reduce a likelihood of a fraudulent user successfully filing the new tax return with one or more federal and state revenue agencies, according to one embodiment.

In the discussion above, certain aspects of one embodiment include process steps or operations or instructions described herein for illustrative purposes in a particular order or grouping. However, the particular order or grouping shown and discussed herein are illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein do not limit the scope of the invention as claimed below.

As discussed in more detail above, using the above embodiments, with little or no modification or input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for using machine-learning to identify and delay or prevent submission of fraudulent content, the system configured to perform operations comprising:

generating training set data indicating characteristics of fraudulent content previously submitted to the system using stolen identity information;

using a machine-learning technique to train an analytics model to identify, based on the training set data, correlations between the characteristics of fraudulent content previously submitted to the system and characteristics of new content received by the system;

receiving new content from a system user, wherein the new content includes a set of data entry characteristics indicating ones of a plurality of user experience pages accessed by the system user;

using the analytics model trained by the machine-learning technique to:
  detect one or more indications that the new content is being submitted using stolen identity information based on the set of data entry characteristics indicating that the system user visited the ones of the plurality of user experience pages in a specific order;
  generate a risk score that quantifies a likelihood that the new content is being submitted using stolen identity information based on the detected indications; and
  determine that the new content is fraudulent based on the risk score exceeding a risk score threshold; and initiating at least one action to delay or prevent a submission of the new content.

2. The system of claim 1, wherein the operations further include:
determining whether the new content is entered manually or by using a script.

3. The system of claim 1, wherein the operations further include:
determining a number of risk categories related to the one or more indications.

4. The system of claim 1, wherein training the analytics model is based on an artificial neural network.

5. A method for using machine-learning to identify and delay or prevent submission of fraudulent content, the method performed by a system and comprising:
generating training set data indicating characteristics of fraudulent content previously submitted to the system using stolen identity information;

using a machine-learning technique to train an analytics model to identify, based on the training set data, correlations between the characteristics of fraudulent content previously submitted to the system and characteristics of new content received by the system;

receiving new content from a system user, wherein the new content includes a set of data entry characteristics indicating ones of a plurality of user experience pages accessed by the system user;

using the analytics model trained by the machine-learning technique to:
  detect one or more indications that the new content is being submitted using stolen identity information based on the set of data entry characteristics indicating that the system user visited the ones of the plurality of user experience pages in a specific order;
  generate a risk score that quantifies a likelihood that the new content is being submitted using stolen identity information based on the detected indications; and
  determine that the new content is fraudulent based on the risk score exceeding a risk score threshold; and initiating at least one action to delay or prevent a submission of the new content.

6. The method of claim 5, further comprising:
determining whether the new content is entered manually or by using a script.

7. A non-transitory computer-readable medium storing instructions that, when executed by one or more processors of a system for using machine-learning to identify and delay or prevent submission of fraudulent content causes the system to perform operations comprising:
generating training set data indicating characteristics of fraudulent content previously submitted to the system using stolen identity information;

using a machine-learning technique to train an analytics model to identify, based on the training set data, correlations between the characteristics of fraudulent content previously submitted to the system and characteristics of new content received by the system;

receiving new content from a system user, wherein the new content includes a set of data entry characteristics indicating ones of a plurality of user experience pages accessed by the system user;

using the analytics model trained by the machine-learning technique to:
  detect one or more indications that the new content is being submitted using stolen identity information based on the set of data entry characteristics indicating that the system user visited the ones of the plurality of user experience pages in a specific order;
  generate a risk score that quantifies a likelihood that the new content is being submitted using stolen identity information based on the detected indications; and
  determine that the new content is fraudulent based on the risk score exceeding a risk score threshold; and initiating at least one action to delay or prevent a submission of the new content.

8. The computer-readable medium of claim 7, wherein execution of the instructions causes the system to perform operations further including:
determining whether the new content is entered manually or by using a script.

* * * * *